US010296536B2

(12) United States Patent
Zuckerberg et al.

(10) Patent No.: US 10,296,536 B2
(45) Date of Patent: *May 21, 2019

(54) TAGGING DIGITAL MEDIA

(75) Inventors: Mark Zuckerberg, Palo Alto, CA (US); Aaron Sittig, Palo Alto, CA (US); Scott Marlette, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/117,888

(22) Filed: May 27, 2011

(65) Prior Publication Data

US 2011/0231747 A1    Sep. 22, 2011

Related U.S. Application Data

(63) Continuation of application No. 13/092,443, filed on Apr. 22, 2011, which is a continuation of application No. 11/580,210, filed on Oct. 11, 2006, now Pat. No. 7,945,653.

(51) Int. Cl.
| | |
|---|---|
| *G06F 16/58* | (2019.01) |
| *G06F 21/62* | (2013.01) |
| *G06Q 50/00* | (2012.01) |
| *H04L 12/58* | (2006.01) |
| *H04L 29/08* | (2006.01) |
| *G06F 21/60* | (2013.01) |
| *G06Q 30/02* | (2012.01) |

(52) U.S. Cl.
CPC .......... *G06F 16/58* (2019.01); *G06F 16/5866* (2019.01); *G06F 21/604* (2013.01); *G06F 21/6218* (2013.01); *G06F 21/6245* (2013.01); *G06Q 30/02* (2013.01); *G06Q 50/01* (2013.01); *H04L 51/32* (2013.01); *H04L 67/306* (2013.01)

(58) Field of Classification Search
USPC ....... 709/217, 223, 225, 203, 206, 219, 204, 709/224, 226; 382/118, 224, 181; 715/745, 751
See application file for complete search history.

(56) References Cited

U.S. PATENT DOCUMENTS

| | | |
|---|---|---|
| 5,937,413 A | 8/1999 | Hyun |
| 6,029,141 A | 2/2000 | Bezos |
| 6,216,133 B1 | 4/2001 | Masthoff |
| 6,236,978 B1 | 5/2001 | Tuzhilin |
| 6,288,717 B1 | 9/2001 | Dunkle |
| 6,411,949 B1 | 6/2002 | Schaffer |
| 6,542,936 B1 | 4/2003 | Mayle et al. |

(Continued)

OTHER PUBLICATIONS

Shneiderman B, et al , "Direct Annotation: A Drag and Drop Strategy for Labeling Photos", Aug. 2000, University of Maryland, Dept of Computer Science.*

(Continued)

*Primary Examiner* — Ramy M Osman
(74) *Attorney, Agent, or Firm* — Baker Botts L.L.P.

(57) ABSTRACT

A method for tagging digital media is described. The method includes selecting a digital media and selecting region within the digital media. The method may further include associating a person or entity with the selected region and sending a notification of the association the person or entity or a different person or entity. The method may further include sending advertising with the notification.

17 Claims, 11 Drawing Sheets

(56) References Cited

U.S. PATENT DOCUMENTS

| | | |
|---|---|---|
| 6,687,878 B1 | 2/2004 | Eintracht et al. |
| 6,829,607 B1* | 12/2004 | Tafoya et al. ............... 709/204 |
| 6,973,201 B1* | 12/2005 | Colmenarez et al. ........ 382/103 |
| 7,010,751 B2* | 3/2006 | Shneiderman ............... 715/232 |
| 7,013,292 B1 | 3/2006 | Hsu |
| 7,062,286 B2* | 6/2006 | Grivas et al. ............... 455/518 |
| 7,068,309 B2 | 6/2006 | Toyama et al. |
| 7,181,046 B2 | 2/2007 | Colmenarez et al. ........ 382/103 |
| 7,249,123 B2 | 7/2007 | Elder |
| 7,258,614 B1 | 8/2007 | Kates et al. ................ 463/42 |
| 7,269,590 B2 | 9/2007 | Hull |
| 7,403,642 B2* | 7/2008 | Zhang ............... G06F 17/30265 |
| | | 382/118 |
| 7,478,078 B2* | 1/2009 | Lunt ..................... G06Q 30/02 |
| 7,603,331 B2 | 10/2009 | Tuzhilin |
| 7,603,352 B1 | 10/2009 | Vassallo et al. |
| 7,634,115 B2* | 12/2009 | Ryu .............................. 382/118 |
| 7,639,634 B2 | 12/2009 | Shaffer et al. ............... 370/352 |
| 7,702,821 B2* | 4/2010 | Feinberg et al. ............. 710/13 |
| 7,716,140 B1* | 5/2010 | Nielsen ................. G06Q 10/10 |
| | | 705/319 |
| 7,739,139 B2* | 6/2010 | Robertson et al. .......... 705/7.12 |
| 7,765,257 B2* | 7/2010 | Chen ..................... H04L 67/306 |
| | | 370/260 |
| 7,779,117 B2* | 8/2010 | Tessman et al. ............. 709/224 |
| 7,827,208 B2* | 11/2010 | Bosworth et al. ............ 707/802 |
| 7,844,671 B1* | 11/2010 | Lawler ................... H04L 51/32 |
| | | 709/204 |
| 7,865,623 B2* | 1/2011 | Mayle et al. ................. 709/206 |
| 7,886,024 B2 | 2/2011 | Kelly et al. |
| 7,945,653 B2* | 5/2011 | Zuckerberg et al. ........ 709/225 |
| 8,005,896 B2 | 8/2011 | Cheah |
| 8,010,458 B2* | 8/2011 | Galbreath ............... G06Q 50/01 |
| | | 705/1.1 |
| 8,031,170 B2* | 10/2011 | Brown et al. ................ 345/156 |
| 8,095,551 B2* | 1/2012 | Kountz et al. ................ 707/758 |
| 8,103,611 B2 | 1/2012 | Tuzhilin |
| 8,139,514 B2* | 3/2012 | Weber et al. ................ 370/312 |
| 8,150,913 B2 | 4/2012 | Cheah |
| 8,254,684 B2* | 8/2012 | Raju ............................ 382/181 |
| 8,279,173 B2* | 10/2012 | Brown et al. ................ 345/156 |
| 8,341,219 B1* | 12/2012 | Young ................... H04N 1/00153 |
| | | 709/204 |
| 8,600,174 B2* | 12/2013 | Shah et al. ................... 382/225 |
| 8,954,432 B2* | 2/2015 | Frigon ..................... G06F 16/58 |
| | | 707/736 |
| 2001/0037721 A1 | 11/2001 | Hasegawa |
| 2002/0059201 A1 | 5/2002 | Work |
| 2002/0069222 A1* | 6/2002 | McNeely ...................... 707/513 |
| 2002/0103813 A1 | 8/2002 | Frigon |
| 2002/0120748 A1* | 8/2002 | Schiavone ............... G06Q 10/107 |
| | | 709/227 |
| 2003/0078968 A1* | 4/2003 | Needham ................ H04L 67/10 |
| | | 709/204 |
| 2003/0145093 A1 | 7/2003 | Oren |
| 2003/0200268 A1* | 10/2003 | Morris ................. H04N 1/00132 |
| | | 709/206 |
| 2003/0222918 A1 | 12/2003 | Coulthard |
| 2003/0225632 A1 | 12/2003 | Tong |
| 2004/0024846 A1 | 2/2004 | Randall |
| 2004/0088177 A1 | 5/2004 | Travis |
| 2004/0139172 A1* | 7/2004 | Svendsen ........... H04N 1/00132 |
| | | 709/219 |
| 2004/0148275 A1 | 7/2004 | Achlioptas |
| 2004/0264780 A1* | 12/2004 | Zhang et al. ................ 382/224 |
| 2005/0021750 A1* | 1/2005 | Abrams ........................ 709/225 |
| 2005/0025298 A1* | 2/2005 | Finnigan ................. H04M 3/533 |
| | | 379/88.22 |
| 2005/0114459 A1* | 5/2005 | Tu et al. ....................... 709/207 |
| 2005/0114759 A1 | 5/2005 | Williams |
| 2005/0154637 A1* | 7/2005 | Nair ....................... G06Q 30/02 |
| | | 705/14.4 |
| 2005/0154639 A1 | 7/2005 | Zetmeir |
| 2005/0159970 A1 | 7/2005 | Buyukkokten |
| 2005/0160167 A1* | 7/2005 | Cheng et al. ................ 709/224 |
| 2005/0171799 A1 | 8/2005 | Hull |
| 2005/0171955 A1 | 8/2005 | Hull |
| 2005/0177385 A1 | 8/2005 | Hull |
| 2005/0197846 A1 | 9/2005 | Pezaris |
| 2005/0198020 A1 | 9/2005 | Garland |
| 2005/0198031 A1* | 9/2005 | Pezaris et al. ................. 707/9 |
| 2005/0198305 A1 | 9/2005 | Pezaris |
| 2005/0203807 A1 | 9/2005 | Bezos |
| 2005/0216300 A1 | 9/2005 | Appelman |
| 2005/0216550 A1 | 9/2005 | Paseman |
| 2005/0221851 A1* | 10/2005 | Grivas et al. ............... 455/518 |
| 2005/0235062 A1* | 10/2005 | Lunt et al. .................. 709/225 |
| 2005/0256756 A1 | 11/2005 | Lam |
| 2005/0270178 A1* | 12/2005 | Ioli ............................. 340/932.2 |
| 2006/0004914 A1* | 1/2006 | Kelly et al. ................. 709/219 |
| 2006/0041543 A1 | 2/2006 | Achlioptas |
| 2006/0042483 A1 | 3/2006 | Work |
| 2006/0048059 A1 | 3/2006 | Etkin |
| 2006/0052091 A1 | 3/2006 | Onyon |
| 2006/0080613 A1 | 4/2006 | Savant |
| 2006/0085419 A1 | 4/2006 | Rosen |
| 2006/0136419 A1 | 6/2006 | Brydon |
| 2006/0143183 A1 | 6/2006 | Goldberg |
| 2006/0161599 A1 | 7/2006 | Rosen |
| 2006/0184617 A1 | 8/2006 | Nicholas |
| 2006/0190281 A1 | 8/2006 | Kott |
| 2006/0194186 A1 | 8/2006 | Nanda |
| 2006/0218225 A1 | 9/2006 | Hee Voon |
| 2006/0229063 A1 | 10/2006 | Koch |
| 2006/0230061 A1 | 10/2006 | Sample |
| 2006/0242178 A1* | 10/2006 | Butterfield et al. .......... 707/100 |
| 2006/0247940 A1 | 11/2006 | Zhu |
| 2006/0248573 A1 | 11/2006 | Pannu |
| 2006/0251292 A1* | 11/2006 | Gokturk et al. .............. 382/103 |
| 2006/0253491 A1 | 11/2006 | Gokturk et al. |
| 2006/0256008 A1 | 11/2006 | Rosenberg |
| 2006/0264209 A1 | 11/2006 | Atkinson et al. |
| 2006/0265227 A1 | 11/2006 | Sadamura |
| 2006/0270419 A1* | 11/2006 | Crowley et al. ............ 455/456.2 |
| 2006/0287916 A1 | 12/2006 | Starr |
| 2006/0293976 A1 | 12/2006 | Nam |
| 2007/0016689 A1 | 1/2007 | Birch |
| 2007/0043688 A1* | 2/2007 | Kountz et al. .................. 707/1 |
| 2007/0079321 A1* | 4/2007 | Ott, IV ................... H04H 60/73 |
| | | 725/18 |
| 2007/0098303 A1* | 5/2007 | Gallagher et al. ........... 382/118 |
| 2007/0118525 A1 | 5/2007 | Svendsen |
| 2007/0157119 A1* | 7/2007 | Bishop ......................... 715/751 |
| 2007/0159651 A1 | 7/2007 | Disario et al. |
| 2007/0162458 A1 | 7/2007 | Fasciano |
| 2007/0162566 A1* | 7/2007 | Desai et al. ................. 709/219 |
| 2007/0174247 A1 | 7/2007 | Xu |
| 2007/0174389 A1 | 7/2007 | Armstrong |
| 2007/0208776 A1* | 9/2007 | Perry et al. .................. 709/104 |
| 2007/0208916 A1 | 9/2007 | Tomita |
| 2007/0255785 A1* | 11/2007 | Hayashi et al. ............. 709/204 |
| 2007/0261071 A1* | 11/2007 | Lunt et al. ................... 725/13 |
| 2007/0266003 A1 | 11/2007 | Wong et al. |
| 2007/0282987 A1 | 12/2007 | Fischer |
| 2008/0005076 A1 | 1/2008 | Payne |
| 2008/0010343 A1 | 1/2008 | Escaffi |
| 2008/0028069 A1* | 1/2008 | Urbanek et al. .............. 709/224 |
| 2008/0033776 A1 | 2/2008 | Marchese |
| 2008/0037841 A1* | 2/2008 | Ogawa ......................... 382/118 |
| 2008/0040428 A1 | 2/2008 | Wei |
| 2008/0059087 A1 | 3/2008 | DiLorenzo |
| 2008/0069449 A1* | 3/2008 | Cho et al. .................... 382/195 |
| 2008/0070697 A1 | 3/2008 | Robinson |
| 2008/0077595 A1* | 3/2008 | Leebow ......................... 707/10 |
| 2008/0086458 A1 | 4/2008 | Robinson |
| 2008/0091549 A1* | 4/2008 | Chang et al. .................. 705/26 |
| 2008/0091723 A1 | 4/2008 | Zuckerberg et al. |
| 2008/0097999 A1* | 4/2008 | Horan ................... H04L 67/306 |
| 2009/0034805 A1* | 2/2009 | Perlmutter et al. .......... 382/118 |
| 2009/0089690 A1* | 4/2009 | Chi et al. ..................... 715/764 |
| 2009/0216806 A1 | 8/2009 | Feuerstein et al. ........... 707/102 |
| 2009/0324022 A1* | 12/2009 | Sangberg et al. ............ 382/118 |
| 2010/0232656 A1* | 9/2010 | Ryu .............................. 382/118 |

(56) References Cited

U.S. PATENT DOCUMENTS

| | | | |
|---|---|---|---|
| 2010/0235400 A1* | 9/2010 | Myers et al. | 707/802 |
| 2011/0202531 A1 | 8/2011 | Zuckerberg et al. | 707/737 |
| 2011/0202822 A1 | 8/2011 | Zuckerberg et al. | 709/206 |
| 2011/0225481 A1 | 9/2011 | Zuckerberg et al. | 709/206 |
| 2011/0314389 A1 | 12/2011 | Meredith et al. | 715/751 |
| 2012/0151047 A1* | 6/2012 | Hodges et al. | 709/224 |
| 2012/0288201 A1* | 11/2012 | Raju | 382/181 |
| 2013/0142402 A1* | 6/2013 | Myers et al. | 382/118 |

OTHER PUBLICATIONS

Sullivan, Danny, "Photo Search: Google Picases 2 vs Adobe Photoshop Album 2", Jan. 17, 2005, searchenginewatch.com.*
Siegler, MS, "Flickr Adds People Tagging", Oct. 21, 2009, techcrunch.com.*
Champ, Heather, "Flickr! It's made of people!", Oct. 21, 2009, http://blog.flickr.net/2009/10/21/people-in-photos.*
Sit et. al., "Digital Photos as Conversational Anchors", Aug. 2005, IEEE, 38th Hawaii International Conference on System Sciences.*
Rex, Erica, "Online Photo Delivery", Jun. 2000, UpSide Magazine, www.upsidetoday.com.*
Boyd et al., "Profiles as Conversation", Jan. 2006, IEEE Computer Society, Proceedings of HICSS-39.*
Jones et al, "Facebook: Threats to Privacy", Dec. 14, 2005.*
Scott, Cameron, "Yahoo, Facebook settle patent dispute", Jun. 6, 2012, Computerworld.com.*
Wikipedia, "List of Photo Sharing Websites", accessed Oct. 24, 2013, en.wikipedia.org/wiki/List_ofphoto_sharing_websites.*
Wikipedia, "List of Social Networking Websites", accessed Oct. 24, 2013, en.wikipedia.org/wiki/List_of_social_networking_websites.*
Rakesh Agrawal, "The Power of the Social Graph", Oct. 10, 2007, reDesign Blog, Access from: http://blog.agrawals.org/2007/10/10/the-power-of-the-social-graph/.*
Quora, "Is Facebook Photo Tagging the Most Viral Social Mechanic Ever Invented?", Oct. 2010, Access from: http://www.quora.com/Facebook-Photos/ls-Facebook-Photo-tagging-the-most-viral-social-mechanic-ever-invented.*
Josh Constine, "Instagram Now Lets Anyone Tag You [or Brands] in Photos . . .", May 2, 2013, TechCrunch, Access from: http://techcrunch.com/2013/05/02/instagram-photo-tagging/.*
Wikipedia, "List of Photo Sharing Websites", accessed Jan. 20, 2014, en.wikipedia.org.*
Wikipedia, "List of Social Networking Websites", accessed Jan. 20, 2014, en.wikipedia.org.*
Shneiderman et al, "Direct Annotation: Drag and Drop Strategy for Labeling Photos", 2000, IEEE Proceedings of Information Visualisation, pp. 88-95.*
SnagIt, "Getting Started Guide. Version 8.0", 2006, TechSmith, p. 15.*
Bajaj, Geetsh, "Using Hotspots in SnagIt", Jul. 2006, Indezine, https://web.archive.org/web/20060715192933/http://indezine.com/products/other/snagithotspots.html.*
Shneiderman et al, "Find that Photo: Interface Strategies to Annotate, Browse and Share", Apr. 2006, Communications of the ACM, vol. 49 No. 4.*
Wolfe, Joanna, "Annotation Technologies: A Software and research review", 2002, University of Louisville.*
Weinberger, David, "Tagging and Why it Matters", May 2005.*
Sarvas, et al , "MobShare: Controlled and Immediate Sharing of Mobile Images", Oct. 2004, Mm'04.*
Nowack, Benjamin, "CONFOTO: Browsing and Annotating Conference Photos on the Semantic Web", 2006, Journal of Web Semantics.*
Lepofsky, Alan, "HotSpots on Pictures—Part 1", May 23, 2006, www.alanlepofsky.net.*
SnagIt 8.0, "SnagIt Capture Preview Window", 2006, www.techsmith.com.*
Complaint for Patent Infringement, filed Mar. 12, 2012 in *Yahoo! Inc. v. Facebook, Inc.*, case No. 12-cv-01212.
Defendant Facebook, Inc.'s Answer; Counterclaim Against Yahoo! Inc. for Patent Infringement, filed Apr. 3, 2012 in *Yahoo! Inc. v. Facebook, Inc.*, case No. 12-cv-01212.
Plaintiff Yahoo! Inc.'s Reply and Counter Counterclaims to Defendant Facebook, Inc.'s Answer; Counterclaim Against Facebook, Inc. for Declaratory Judgment of Non-Infringement, filed Apr. 27, 2012 in *Yahoo! Inc.v. Facebook, Inc.*, case No. 12-cv-01212.
U.S. Appl. No. 11/639,655, filed Dec. 14, 2006, Mark Zukerber.
U.S. Appl. No. 11/646,206, filed Dec. 26, 2006, Aaron Sittig.
U.S. Appl. No. 11/493,291, filed Jul. 25, 2006, Mark Zuckerberg.
U.S. Appl. No. 11/701,698, filed Feb. 2, 2007, Jed Stremel.
U.S. Appl. No. 11/713,455, filed Feb. 28, 2007, Jed Stremel.
U.S. Appl. No. 11/701,566, filed Feb. 2, 2007, Jed Stremel.
U.S. Appl. No. 11/502,757, filed Aug. 11, 2006, Andrew Bosworth.
U.S. Appl. No. 11/503,093, filed Aug. 11, 2006, Andrew Bosworth.
U.S. Appl. No. 11/503,037, filed Aug. 11, 2006, Mark Zuckerberg.
U.S. Appl. No. 11/505,242, filed Aug. 11, 2006, Mark Zuckerberg.
U.S. Appl. No. 11/499,093, filed Aug. 2, 2006, Mark Zuckerberg.
U.S. Appl. No. 11/893,493, filed Aug. 15, 2007, Arieh Steinberg.
U.S. Appl. No. 11/982,974, filed Nov. 5, 2007, Ruchi Sanghvi.
U.S. Appl. No. 11/701,595, filed Feb. 2, 2007, Ezra Callahan.
U.S. Appl. No. 11/726,962, filed Mar. 23, 2007, Charlie Cheever.
U.S. Appl. No. 11/701,744, filed Feb. 2, 2007, Andrew Bosworth.
U.S. Appl. No. 11/796,184, filed Apr. 27, 2007, Jared S. Morgensterhn.
U.S. Appl. No. 11/893,797, filed Aug. 16, 2007, Yun-Fang Juan.
U.S. Appl. No. 11/893,820, filed Aug. 16, 2007, Yun-Fang Juan.
U.S. Appl. No. 11/899,426, filed Sep. 5, 2007, Jared Morgenstern.
U.S. Appl. No. 12/072,003, filed Feb. 21, 2008, Arieh Steinberg.
U.S. Appl. No. 12/077,070, filed Mar. 13, 2008, Dave Fetterman.
U.S. Appl. No. 12/154,504, filed May 23, 2008, Adam D'Angelo.
U.S. Appl. No. 12/156,091, filed May 28, 2008, Mark Zuckerberg.
U.S. Appl. No. 12/151,734, filed May 7, 2008, Jared Morgenstern.
U.S. Appl. No. 12/154,886, filed May 27, 2008, Nico Vera.
U.S. Appl. No. 60/965,624, filed Aug. 20, 2007, Adam D'Angelo.
U.S. Appl. No. 11/893,559, filed Aug. 15, 2007, Adam D'Angelo.
U.S. Appl. No. 60/967,842, filed Sep. 7, 2007, Ezra Callahan.
U.S. Appl. No. 60/966,442, filed Aug. 28, 2007, Ezra Callahan.
U.S. Appl. No. 60/965,852, filed Aug. 22, 2007, Adam D'Angelo.
U.S. Appl. No. 61/005,614, filed Dec. 5, 2007, Yishan Wong.
U.S. Appl. No. 12/080,808, filed Apr. 2, 2008, Peter Deng.
Flores, Fernando et al. "Computer Systems and the Design of Organizational Interaction"; In ACM Transations on Information Systems (TOIS), vol. 6, Issue 2, Apr. 1988.
Chipin, Chipin: The Easy Way to Collect Money [online], http://web.archive.org/web/20061215090739/www.chipin.com/overview, Dec. 15, 2006.
Parzek, E. Social Networking to Chipin to a Good Cause [online]. Business Design Studio, http://www.businessdesignstudio.com/resources/blogger/2006/06social-networking-tochipin-to-good.html, Jun. 29, 2006.
Shneiderman et al., "Direct Annotation: A Drag and Drop Strategy for Labeling Photos", International Conference on Information Visulization, Aug. 2000.
Brush et al., "Notification for Shared Annotation of Digital Documents", ACM, CHI vol. #4, Issue #1, Apr. 2002.
Marlow et al., "HT06, Tagging Paper, Taxonomy, Flickr, Academic Article, to Read" ACM, Aug. 2006.
U.S. Appl. No. 13/092,443, filed Dec. 27, 2011, Non-Final Office Action.
U.S. Appl. No. 13/092,443, filed May 22, 2012, Interview Summary.
U.S. Appl. No. 13/092,443, filed Jun. 27, 2012, Response to Non-Final Office Action.
U.S. Appl. No. 13/092,443, filed Jul. 20, 2012, Final Office Action.
U.S. Appl. No. 13/097,521, filed May 2, 2012, Non-Final Office Action.
U.S. Appl. No. 13/097,521, filed Jul. 2, 2012, Response to Non-Final Office Action.
U.S. Appl. No. 13/117,617, filed Nov. 10, 2011, Non-Final Office Action.
U.S. Appl. No. 13/117,617, filed May 7, 2012, Response to Non-Final Office Action.

(56) References Cited

OTHER PUBLICATIONS

U.S. Appl. No. 13/117,617, filed Jun. 22, 2012, Non-Final Office Action.
U.S. Appl. No. 13/117,617, filed Sep. 13, 2012, Interview Summary.
Office Action for U.S. Appl. No. 13/092,443, filed Jun. 28, 2013.
Non Final Office Action for U.S. Appl. No. 13/092,443, filed Jan. 10, 2013.
Response to Non Final Office Action for U.S. Appl. No. 13/092,443, filed Apr. 10, 2013.
Non Final Office Action for U.S. Appl. No. 13/097,521, filed Feb. 21, 2013.
Final Office Action for U.S. Appl. No. 13/117,617, filed Jan. 4, 2013.

* cited by examiner

TAGGING DIGITAL MEDIA

CROSS-REFERENCE TO RELATED APPLICATIONS

The present application is a Continuation of U.S. patent application Ser. No. 13/092,443, on Apr. 22, 2011 for "System and Method for Tagging Digital Media," which is a Continuation of U.S. Pat. No. 7,945,653 filed on Oct. 11, 2006, issued on May 17, 2011 for "System and Method for Tagging Digital Media," which is incorporated herein by reference for all purposes. This application also incorporates by reference U.S. Provisional Patent Application Ser. No. 60/750,844 filed on Dec. 14, 2005 for "Systems and Methods for Social Mapping," U.S. Provisional Patent Application Ser. No. 60/753,810 filed on Dec. 23, 2005 for "Systems and Methods for Social Timeline," U.S. patent application Ser. No. 11/493,291 filed on Jul. 25, 2006 for "Systems and Methods for Dynamically Generating a Privacy Summary," U.S. patent application Ser. No. 11/502,757 filed on Aug. 11, 2006 for "Systems and Methods for Generating Dynamic Relationship-Based Content Personalized for Members of a Web-Based Social Network," U.S. patent application Ser. No. 11/503,093 filed on Aug. 11, 2006 for "Systems and Methods for Measuring User Affinity in a Social Network Environment," U.S. patent application Ser. No. 11/503,037 filed on Aug. 11, 2006 for "Systems and Methods for Providing Dynamically Selected Media Content to a User of an Electronic Device in a Social Network Environment," and U.S. patent application Ser. No. 11/503,242 filed on Aug. 11, 2006 for "System and Method for Dynamically Providing a News Feed About a User of a Social Network."

FIELD OF THE INVENTION

The present invention relates generally to internet digital content, and more particularly to systems and methods for tagging digital media.

DESCRIPTION OF RELATED ART

Various websites have developed systems for organizing photos into albums available for viewing by other network users.

Some social networking websites offer mechanisms that may allow the user to select particular photos or albums for immediate viewing. Typically, however, these photos are disparate and disorganized. In other words, the user must spend time visually searching through albums, photo by photo, for individuals or objects that are not presented in a coherent or consolidated manner. Often, many of the photos do not depict persons or objects of interest to the user. Just as often, the user remains unaware of the existence of some photos that were overlooked. What is needed is a method to organize digital media and automatically generate notifications to persons or entities interested in the digital media.

SUMMARY OF THE INVENTION

The present invention includes systems and methods for tagging digital media in a social network environment administered by a social network server. In various embodiments, digital media may include digital images, digital video, digital audio, digital audio visual media, computer games, digital books, digital text, and/or the like. A user of a social network may upload digital media (e.g., a digital image) to a file (e.g., an album) on their web page thus becoming a media owner of the digital image. The media owner may select and tag a region of the image by clicking on a point in the digital image to select the region and typing appropriate text to tag the region. The media owner may select and tag multiple regions. In one embodiment, the tagged region is indicated by a border superimposed over the digital image. In one embodiment, the tagged text is displayed with the image, and the border is viewed by selecting the tagged text (e.g., by placing the cursor over the tagged text). Users in the social network environment may visit the media owner's web page via the network and select the tagged text to view the tagged region in the digital image. In some embodiments, other users can tag the media owner's images.

In some embodiments, the tagged text includes contact information (e.g., an email address) identifying a tagged user within the social network environment. In various embodiments, contact information includes an email address, a phone number, a mailing address, a user account, a user name, a text message number, a voice mail user number, a pager number, an instant message address, and/or the like. Contact information may also include a name of a person or entity or information regarding a third person or entity. The tagged user may receive an automatic email notification via the social network that his or her email address has been used to tag the digital image. The notification may include a hyperlink providing the tagged user an opportunity to view the digital media and tagged region, and/or visit the media owner's web page. The hyperlink may further provide the tagged user an opportunity to confirm or disaffirm the tagged text that includes the email address. When the tagged text has been disaffirmed, tags may not be displayed to other users visiting the media owner's web page.

In some embodiments, the tagged text includes contact information (e.g., an email address) for a tagged non-user outside the social network environment (non-member). The tagged non-user may receive an automatic email notification via the internet that his or her email address has been used to tag the digital media. The notification may include a hyperlink providing the tagged non-user an opportunity to view the digital media and the tagged region and, optionally, visit the owner's web page. The hyperlink may further provide the tagged non-user an invitation to become a member of the social network environment. Upon becoming a member of the social network environment, the tagged non-user and may visit the owner's web page (as a tagged user) and confirm or disaffirm the tagged text including the tagged non-user's email address.

Exemplary embodiments describe methods for tagging digital media. In some embodiments, the methods include selecting the digital media and selecting a region within the digital media. The method further includes associating a person or entity with the selected region within the digital media and may further include sending a notification of the association to the person or entity, or to a third person or entity.

DETAILED DESCRIPTION

Figure 1:
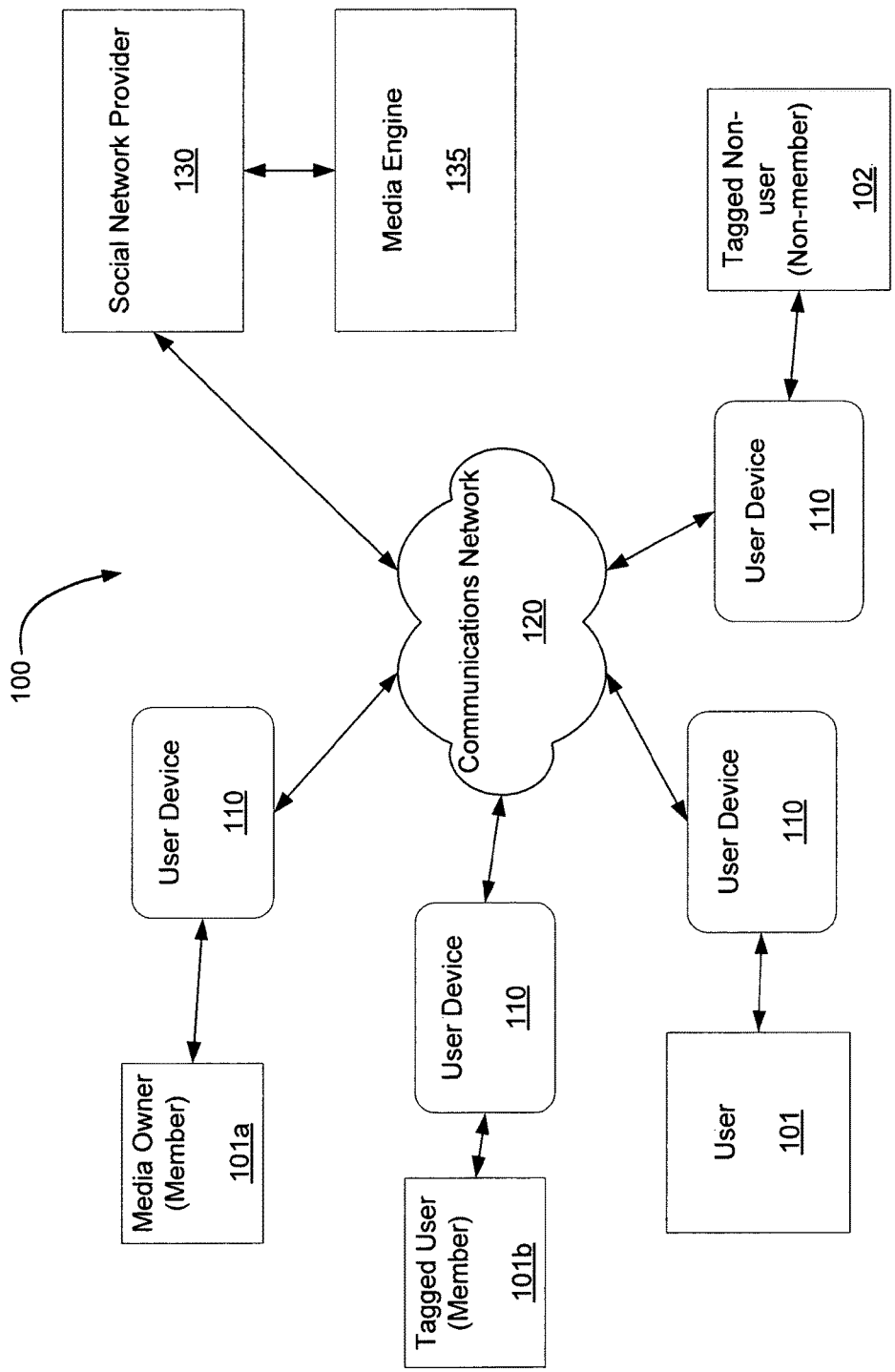
FIG. 1 illustrates an exemplary social network environment for tagging digital media.

FIG. 1 illustrates an exemplary environment for tagging digital media, such as in a social network environment 100. One or more users 101, at user devices 110, are coupled to a social network provider 130 via a communications network 120. In various embodiments, user devices 110 include a computer terminal, a personal digital assistant (PDA), a wireless telephone, a digital camera, and/or the like. In various embodiments, the communications network 120 includes a local area network (LAN), a wide area network (WAN), a wireless network, an intranet, an internet, and/or the like. In one embodiment, users 101 comprise various types of users, including a user who is a digital media owner 101a (e.g., a user 101 who uploads digital media) and a user who is a tagged user 101b (e.g., a user 101 associated with a region in the digital media). In various embodiments, digital media includes digital images, digital video, digital audio, digital audiovisual media, digital text, digital books, online game icons, online game avatars, and/or the like. For the purposes of illustration, digital images are discussed herein. However, one skilled in the art would understand that the discussion applies equally to a wide variety of digital media. The use of digital images is not intended to be limiting.

The social network provider is an entity or person that provides social networking services, communication services, dating services, company intranets, online games, and so forth. For example, the social network provider 130 may host a website that allows one or more users 101, e.g., the media owner 101a and/or the tagged user 101b, at one or more user devices 110, to communicate with one another via the website. The social network environment 100 offers users 101, e.g., the media owner 101a, an opportunity to connect or reconnect with the one or more other users 101, e.g., the tagged user 101b and/or other users 101 that attended, for example, the same university as the media owner 101a. In some embodiments, a social network environment 100 includes a segmented community. A segmented community according to one embodiment is a separate, exclusive or semi-exclusive social network environment 100, or social network environment 100 wherein each user 101 who is an authenticated segmented community member may access and interact with other members of their respective segmented community.

The social network environment 100 may further offer users 101 an opportunity to connect or reconnect with one or more non-users outside the social network environment 100. One example of such non-user is a tagged non-user 102. The tagged non-user 102 may be coupled to the social network provider 130, at a user device 110 via the communications network 120.

The social networking environment 100 further includes a media engine 135. The media engine 135 is configured to provide the user 101 media services for manipulating media (e.g., digital images) within the social network environment 100. Examples of digital image manipulation include creating albums within the user's 101 web page, uploading digital images to the user's 101 albums, associating captions with the digital images, tagging the digital images with information about regions within the digital images, stacking digital images, deleting digital images, deleting albums, and the like.

Figure 2:
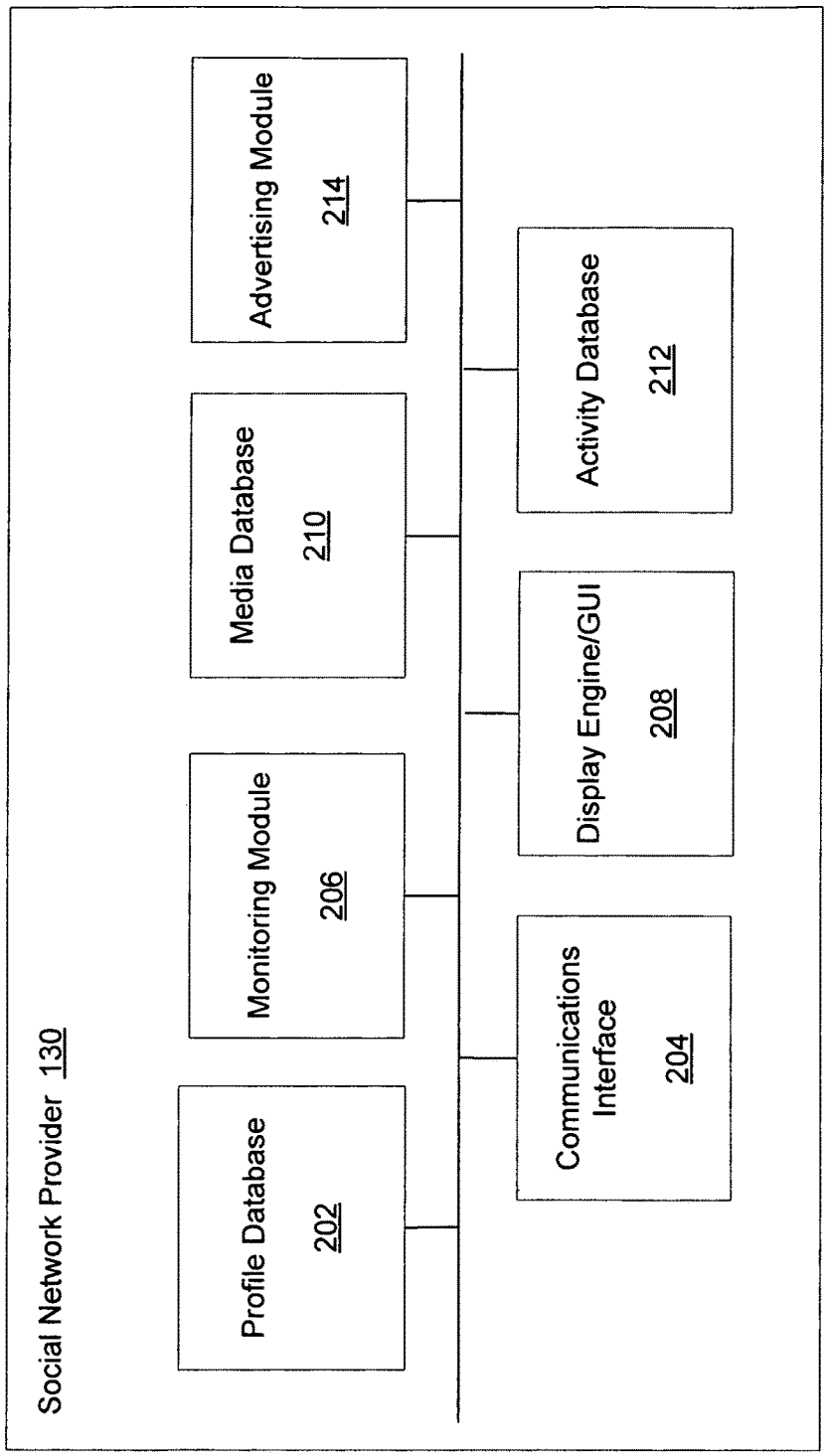
FIG. 2 is a block diagram of an exemplary social network provider.

Referring now to FIG. 2, a block diagram of an exemplary social network provider, such as the social network provider 130 shown in FIG. 1, is shown. The social network provider 130 includes a profile database 202, a communications interface 204, a monitoring module 206, a media database 210, a display engine/GUI 208, an activity database 212, and an advertising module 214. Although the social network provider 130 is described as being comprised of various components (the profile database 202, the communications interface 204, the monitoring module 206, the display engine/GUI 208, the media database 210, the activity database 212, and the advertising module 214), fewer or more components may comprise the social network provider 130 and still fall within the scope of various embodiments.

The profile database 202 is provided for storing data associated with each of the users, such as the user 101 associated with user device 110. When the user 101 subscribes to services provided by the social network provider 130, a user profile may be generated for user 101. For example, the user 101 may select privacy settings, provide contact information, provide personal statistics, specify memberships in various organizations, indicate interests, list affiliations, post class schedules, detail work activities, or group other users 101 according to one or more categories. Although the users at the user devices 110 can group other users according to categories, such as "friends", "school", "geography", "business", and so forth, any type of grouping may be employed by the user and/or the social network provider 130. Further, according to some embodiments, the user may select privacy settings for Jane, privacy settings for John, and/or privacy settings for grouping of users, which may or may not include Jane and John. When the user 101 adds additional information to the user profile, such as adding additional albums, the user profile in the profile database 202 may be updated with icons of the additional albums. The user profile may be stored, modified, added, and so forth to any storage medium. A timestamp may be associated with the user profile, in the profile database 202. Examples of timestamps include order of occurrence in the profile database 202, date, time of day, and the like.

According to exemplary embodiments, one or more networks may be provided for each user. Each user may select different privacy settings for different networks. For example, the user at the user device 110 may have a network comprised of people grouped according to a university attended, a network comprised of people grouped according to the user's geographical location of residence, a network comprised of people grouped according to a common field of work, a network comprised of people grouped according to a particular business, and so forth. The user at the user device 110 can then select privacy settings for each of these networks.

Any type of network may be provided by the social network provider 130. In other words, a network may comprise people grouped according to any type of category, such as various social networks described herein, like "friends", "geographical location", and so forth. The user may specify the networks, the categories, subcategories, and so forth and/or the networks, the categories, the subcategories, and so on may be predetermined by the social network provider 130.

A single user profile may represent the various networks in which the user participates, with different privacy setting options available for each network, as discussed herein, For example, the user at the user device 110 may select different privacy settings for a university network and far a geographical location network. Alternatively, the user at the user device 110 may have a separate user profile for each network in which the user participates, with different privacy setting options available for each user profile. For example, the user at the user device 110 may have a separate user profile for the university network and for the geographical location network, each user profile having privacy setting options available for each network by virtue of the separate user profiles associated with each of the networks.

According to some embodiments, the user can select the same privacy settings for one or more of the networks. In other words, the social network provider 130 may provide the user with an option to select privacy settings once for more than one of the networks and/or more than one category or subcategory. Accordingly, the user may select one set of privacy settings for both the university network and the geographical location network.

According to some embodiments, the user profile is created outside of the social network environment 100 and provided to the profile database 202 for local access by the social network provider 130. Alternatively, the profile database 202 is located remotely and accessed by the social network provider 130.

The communications interface 204 is configured to communicate with users 101, such as via the user device 110 over the network 104. The user device 110 communicates various types of information, such as digital media (e.g., digital images), privacy settings selections, groupings of other users 101, and so forth, to the social network provider 130 via the communications interface 204. Any type of communications interface 204 is within the scope of various embodiments.

The monitoring module 206 tracks one or more user's 101 activities on the social network environment 100. For example, the monitoring module 206 can track the user's 101 interaction with one or more items of digital media, such as digital images, news stories, other users' 101 profiles, email to other users 101, chat rooms provided via the social network provider 130, and so forth. Any type of user activity can be tracked or monitored via the monitoring module 206. The information, digital media (e.g., digital images), people, groups, stories, and so forth, with which the user 101 interacts, may be represented by one or more objects, according to various embodiments. The monitoring module 206 may determine an affinity of the user 101 for subjects, other user's 101 digital images, relationships, events, organizations, and the like, according to users' 101 activities.

The display engine/GUI 208 displays the one or more items of digital media (e.g., digital images), profile information, and so forth, to users 101. Users 101 can interact with the social network provider 130 via the display engine/GUI 208. For example, users 101 can select albums, access individual digital images, access other users' 101 digital images available via the social network provider 130, and so forth, via the display engine/GUI 208. The albums and/or digital images may be displayed in a field in the display engine/GUI 208.

The media database 210 is configured to store data about digital media (e.g., digital images) for users 101. Information about the digital images includes album location, captions, tags, date information, access privileges, and the like. In various embodiments, the media owner 101a can assign an image to a selected album, associate captions with the images, and associate tags with the images, using the media database 210. In one embodiment, the media owner 101a may tag a digital image using the email address of the tagged user 101b and associating the email address with a region of the digital image. The association between the digital image and the email address may be stored in the media database 210. The media owner 101a can store access privileges to a digital image, according to groups, networks, and so forth, in the media database 210.

The activity database 212 is configured to store activity data (e.g., tracked by the monitoring module 206) about each user 101. The activities may be tracked by the monitoring module 206. Activities monitored by the monitoring module 206 may be stored in the activity database 212. Activity entries in the activity database 212 may include a timestamp indicating time and date of the activity, the type of activity, the user 101 initiating the activity, any other users 101 who are objects of the activity, and the like. Activities may be stored in multiple databases, including the activity database, the profile database, the relationship database, and so forth. Examples of activities stored in the activity database 212 include creating albums, uploading digital images, deleting digital images, deleting albums, tagging digital images, and/or the like. For example, an entry in the activity database 212 may record that a digital image was uploaded to an album at 14:52 on March 31, or that the digital image was tagged at 15:12 on March 31.

According to various embodiments, one or more networks are provided for each user 101 within the social network environment 100. For example, user 101 may have a network comprised of other users 101 within the social network environment who are grouped according to a university attended, a network comprised of people grouped according to the user's geographical location of residence, a network comprised of people grouped according to a common field of work, a network comprised of people grouped according to a particular business, and so forth. A common network may establish a relationship between user 101 and other users 101 in the common network.

The advertising module 214 is configured to provide advertising to users 101 via the communications interface 204 and/or the display engine/GUI 208. The advertising module 214 may determine appropriate advertising using the profile database 202, the monitoring module 206, and/or the activity database 212. For example, the monitoring module 206 may communicate to the advertising module 214 that a digital image upload is in progress via the communications interface 204. The advertising module 214 selects the advertising according to the profile of the user 101 in the profile database 202 and displays the advertising to the user 101 via the display engine/GUI 208 during the upload. Since the user 101 is likely to be focused on the display, watching for the upload to complete, the advertising module 214 may further tailor selection of the advertising for effect on the focused user 101.

Any type of network may be provided by the social network provider 130. In other words, a network may comprise people grouped according to any type of category, such as various social networks described herein, like "friends," "geographical location," and so forth. User 101 may specify the networks, the categories, subcategories, and so forth and/or these may be predetermined by the social network provider 130. The networks, categories, the subcategories, and so forth, may comprise a relationship with the user 101, as discussed herein, but do not necessarily comprise the only relationship user 101 has with the other users 101.

Figure 3A:
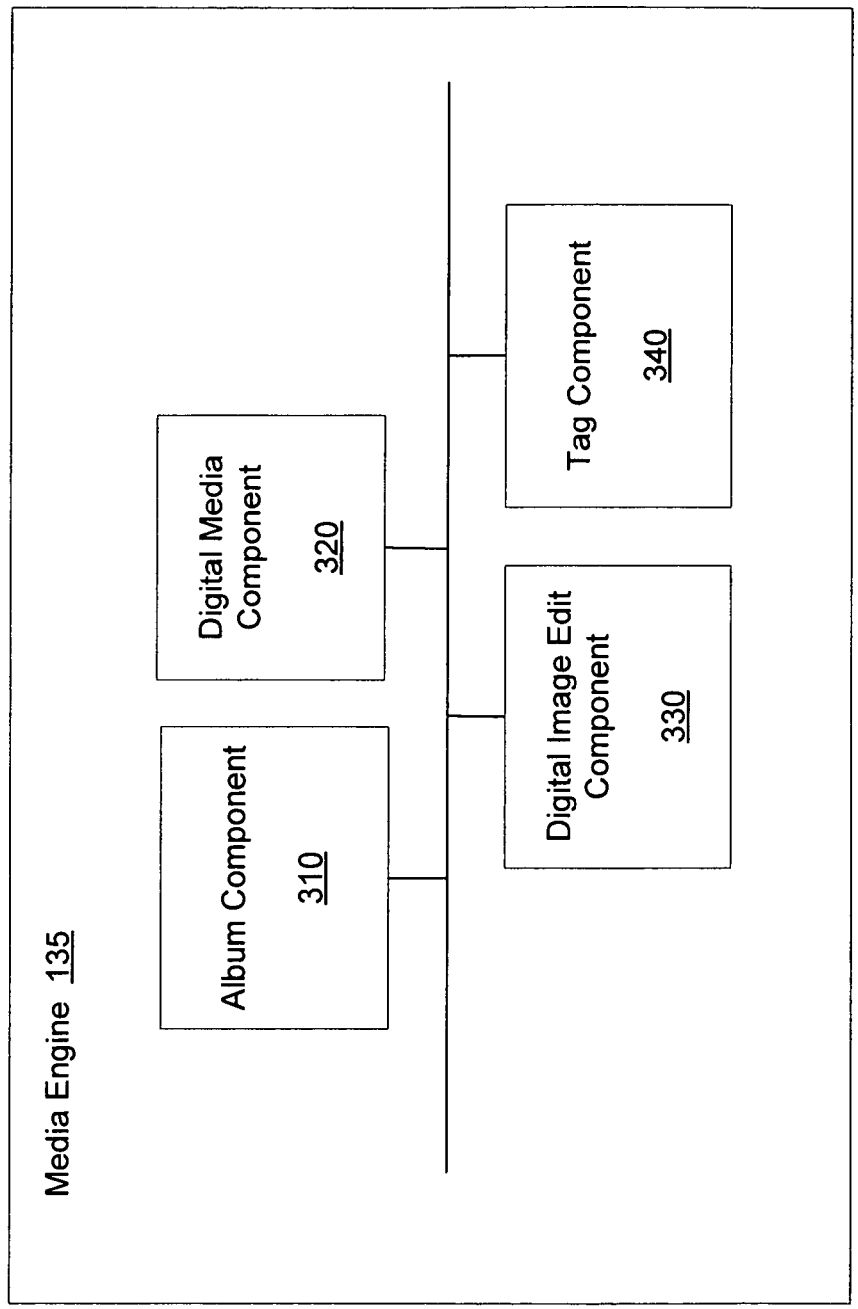
FIG. 3A is a block diagram of an exemplary media engine.

FIG. 3A is a block diagram of an exemplary media engine 135. The media engine 135 is configured to provide the user 101 media services for manipulating digital media (e.g., digital images) within the social network environment 100. Examples of digital image manipulation include creating albums within the user's 101 web page, uploading digital images to the user's 101 albums, associating captions with the digital images, tagging the digital images with information about regions within the digital images, deleting digital images, deleting albums, and the like.

The media engine 135 includes an optional album component 310, a digital media component 320, a digital image edit component 330, and a tag component 340. Although the media engine 135 is described as being comprised of various components (e.g., the album component 310, the digital media component 320, the digital image edit component 330, and the tag component 340), fewer or more components may comprise the media engine 135 and still fall within the scope of various embodiments.

The album component 310 is configured to create albums and/or delete albums. An album may be a collection of digital media (e.g., digital images, digital audio, digital video, and/or the like). Various embodiments of an album include a list of digital media, a folder containing media files, a file, and or the like.

Figure 3B:
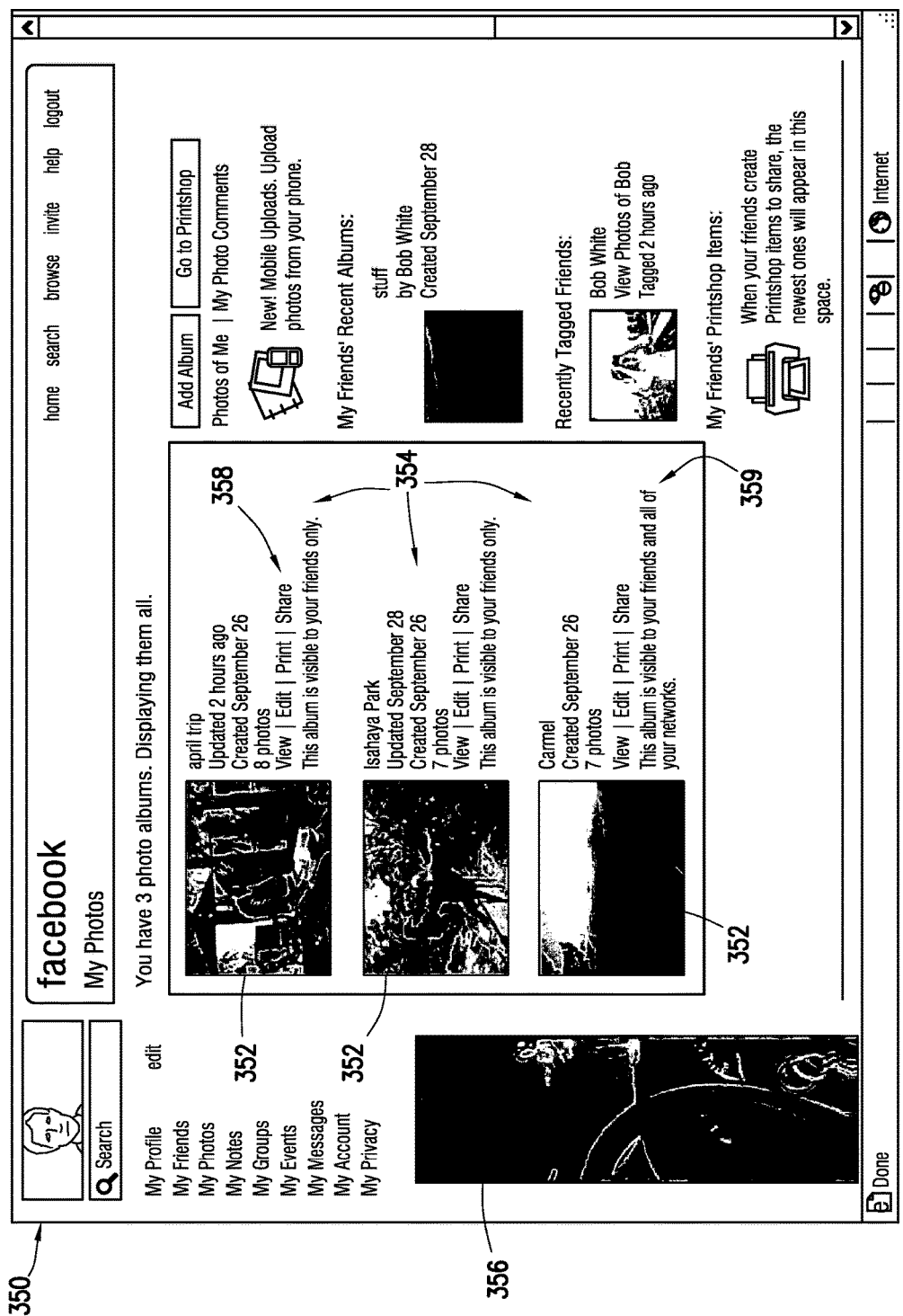
FIG. 3B is an exemplary screen shot of an album web page.

FIG. 3B is an exemplary screen shot of an album web page 350. The album web page 350 includes one or more album icons 352. In various embodiments, creating an album includes assigning a name to the album, recording a time stamp for the album, recording descriptive text about the album, assigning access privileges for who can view and/or modify the contents of the album, and the like.

The album component 310 is further configured to display information about the album. In some embodiment, the information about the albums includes a list of albums and the number of albums associated with the user 101. The album component 310 further includes an optional album caption 354. The album caption 354 may include, in various combinations, an album name, a time stamp, descriptive text about the album, privilege information, the number of digital images in the album, the access privileges, and the like. In some embodiments, the album component 310 uses a digital image from the album as the album icon 352. In various embodiments, the album component 310 displays further information about the albums including which album is the most recently updated, which album is the most popular, which albums contain digital images that have been tagged by other users 101, and/or the like.

Optionally, the album component 310 displays advertising 356, which may be received from the advertising module 214. In various embodiments, the album component 310 includes one or more links 358 and software code configured to view the album and/or the contents of the album, edit the album and/or the contents of the album, print the album and/or contents of the album, share the album and/or the contents of the album with other users 101, and the like. In some embodiments, a privacy setting 359 may be associated with the album by the album component 310. The privacy setting 359 may limit access to, for example, users 101 who are friends of the media owner 101*a*, any user 101 of the social network environment 100 who is within the media owner's 101*a* personal network, any user 101 of the social network environment 100, and so forth.

Figure 3C:
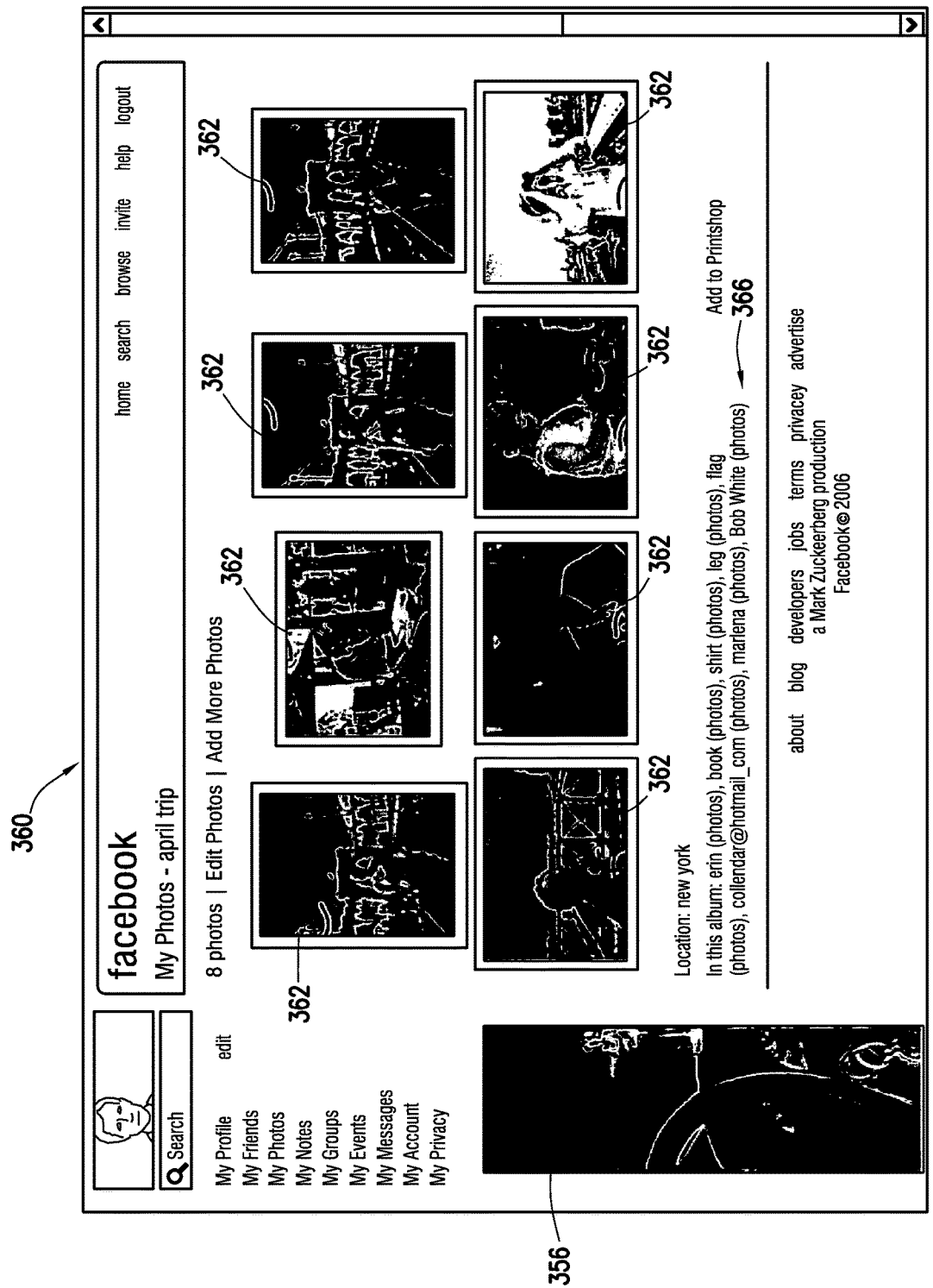
FIG. 3C is an exemplary screen shot of a digital image web page.

FIG. 3C is an exemplary screen shot of a digital image web page 360. The digital media component 320 is configured to upload digital media (e.g., one or more digital images 362) to an album. In various embodiments, the digital images 362 may be uploaded from a local disk on the user device 110, a personal digital assistant, a cell phone, a camera, remote user device 110, and the like. Optionally, the digital media component 320 resizes the digital image 362 while uploading the digital image 362. The digital images 362 may be uploaded to a storage device associated with the social network environment (e.g., a storage device on the user device 110, the social network provider 130, and/or the like). According to some embodiments, the digital images 362 are stored outside of the social network environment 100 and provided to the digital media component 320 for local access via the social network provider 130. Alternatively, the digital images 362 are located remotely and accessed by the social network provider 130. The digital media component 320 is further configured to delete digital images 362 from the album.

The digital media component 320 is further configured to display information about the digital images 362. In some embodiments, the information about the digital images 362 includes a list of digital images 362 in the album and the number of digital images 362 in the album that are associated with the user 101. In various embodiments, the information further includes, for each digital image 362, the name of the digital image 362, a representative icon, a date stamp, the access privileges, and the like. In some embodiments, the digital media component 320 provides the user 101 an option to select a digital image 362 for use in the album as the representative icon for an album. In various embodiments, the digital media component 320 displays further information about the digital images 362 including which digital image 362 is the most recently updated, which digital image 362 is the most popular, which digital images 362 have been tagged by other users 101, and the like. Optionally, the digital media component 320 displays advertising 356, which may again be received from the advertising module 214. In various embodiments, the digital media component 320 includes links and software code configured to view the digital image 362, edit the digital image 362, print the digital image 362, share the digital image 362 with other users 101, and the like. In some embodiments, the digital media component 320 includes a tag list 366.

Figure 3D:
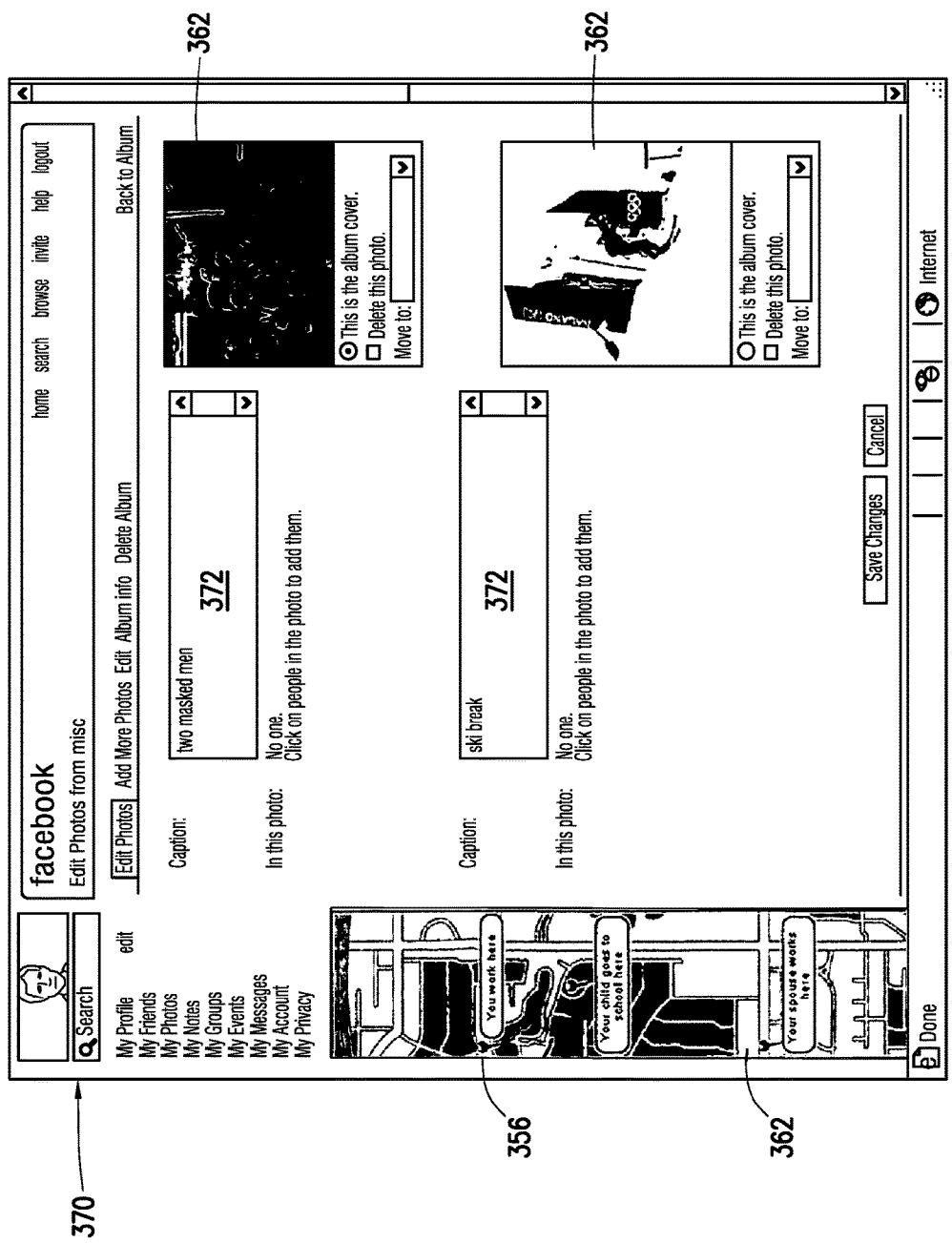
FIG. 3D is an exemplary screen shot of a digital image edit web page.

FIG. 3D is an exemplary screen shot of a digital image edit web page 370. The digital image edit component 330 is configured to provide the user 101 with various editing functions to apply to the digital images 362. In various embodiments, the editing functions include rotation, sizing, color adjustment, cropping, tagging, and the like. For example, captions for the digital images 362 may be entered in a caption text entry box 372. In some embodiments, a radio button may be used to designate the corresponding digital image 362 as the album icon 352. The tag component 340 is configured to select a region in the image and associate text with the region. In some embodiments, the tag component 340 includes digital image editing functions.

Although digital images 362 and information about the digital images 362 are described as being manipulated and/or displayed by the various components of media engine 135, the media engine 135 may manipulate and display information about various other forms of digital media, including digital images, digital video, digital audio, digital audiovisual media, digital text, and/or the like.

Figure 4:
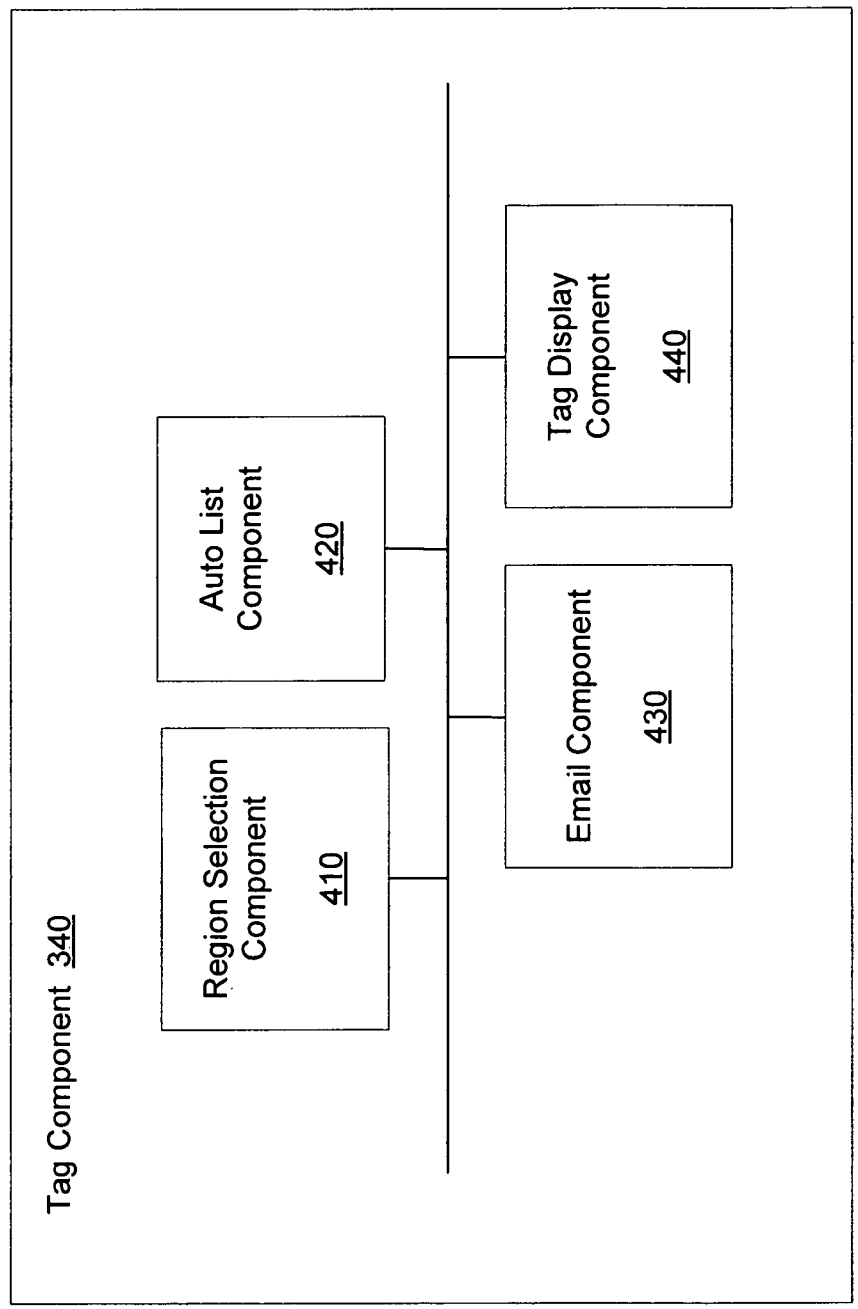
FIG. 4 is a block diagram of an exemplary tag component.

FIG. 4 is a block diagram of an exemplary tag component 340. The tag component 340 includes a region selection component 410, an auto list component 420, a tag display component 440, and an email component 430. The operation of these components is discussed below with reference to FIG. 5. Although the tag component 340 is described as being comprised of various components (e.g., the region selection component 410, the auto list component 420, the email component 430, and the tag display component 440), fewer or more components may comprise the tag component 340 and still fall within the scope of various embodiments. Although the tag component 340 is described as operating on digital images 362, the tag component 340 may operate on various digital media, e.g., digital images, digital video, digital audio, digital audiovisual media, digital text, and/or the like.

Figure 5:
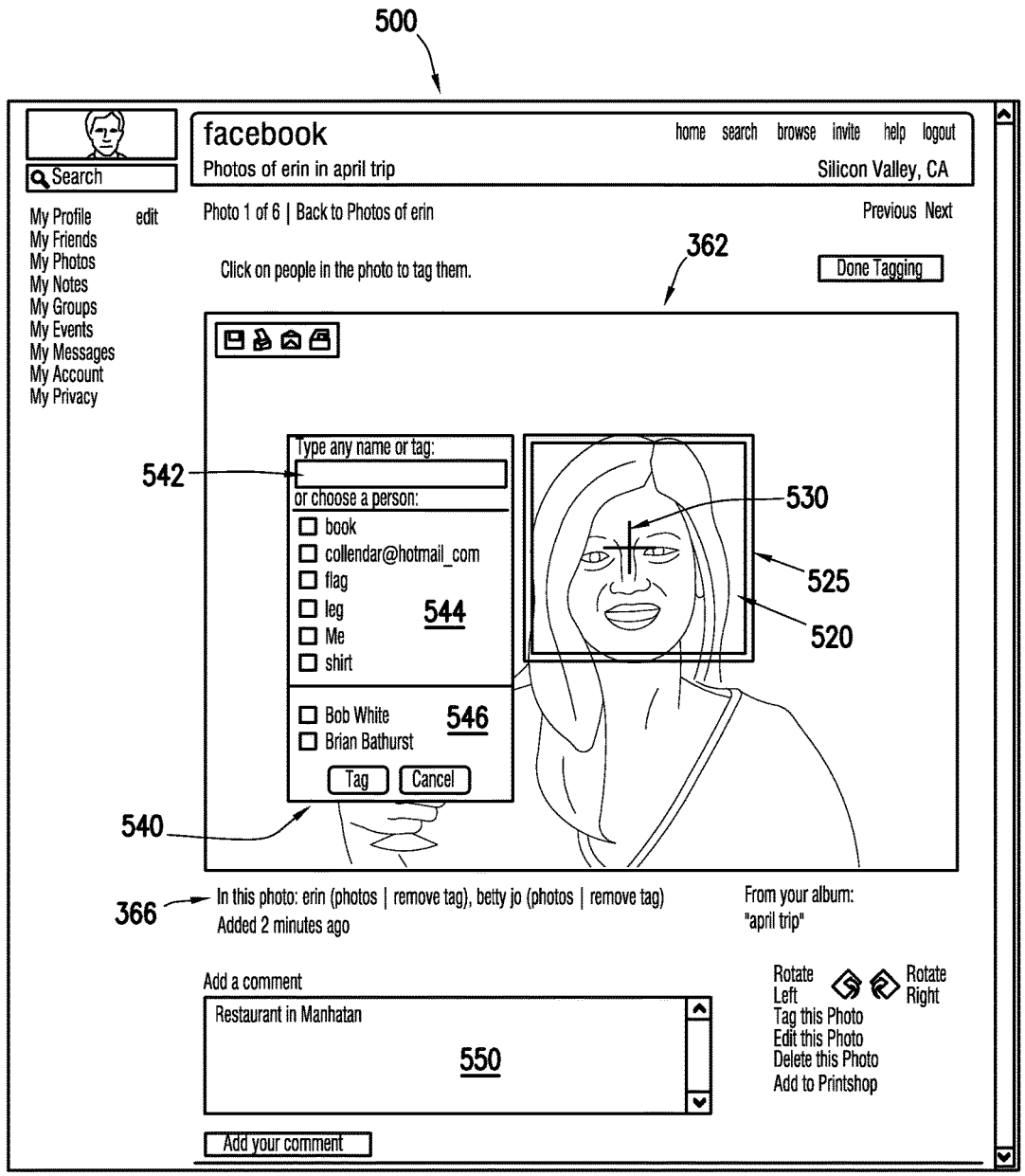
FIG. 5 is an exemplary screen shot of a tag web page.

FIG. 5 is an exemplary screen shot of a tag web page 500 illustrating various functions of the components of the exemplary tag component 340. The region selection component 410 is configured to receive input from a user 101 (e.g., the media owner 101a, the tagged user 101b, and etc.) and/or a non-member, (e.g., the tagged non-user 102). The region selection component 410 is further configured to select a region (e.g., a selected region 520) within a digital image 362 according to the input. In some embodiments, the user 101 moves a cursor 530 on the user device 110 to a point in the digital image 362 using a mouse, trackball, track pad, or the like. The user 101 clicks on the point and the region selection component 410 places a border 525 around the selected region 520. In various embodiments, the shape of the selected region 520 may be a rectangle, circle, ellipse, or polygon. The size of the selected region 520 may be fixed, may be determined by the user 101, or may be automatically determined. In various embodiments, the point the media owner 101a clicks on may be in the center, a corner, or some other location of the selected region 520.

FIG. 5 illustrates a border 525 around the selected region 520. However, a line, highlight, or some other indicia may be generated by the region selection component 410 and superimposed on the digital image 362 using the display engine/GUI 208, to indicate the selected region 520. In some embodiments, if the user 101 is not satisfied with the selection, the user 101 may move the cursor 530 and click on a different point. A new border 525 will surround a new selected region 520. The user 101 may continue to click on various points within the digital image 362 until the user 101 is satisfied with the selected region 520. In some embodiments, the user 101 may select a region 520 in the digital image 362 using a click-and-drag operation to define a rectangle, circle, ellipse, polygon, and the like. In some embodiments, the user 101 may click on multiple points to define vertices of a polygon. In one embodiment, region selection component 410 includes code to automatically calculate a selected region 520 relative the selected point using properties of the digital image 362 including contrast, brightness, color, size, and/or the like.

A comment field 550 may contain text including general information related to the digital image 362. Text may be entered into the comment field 550 by the media owner 101a of the image.

The auto list component 420 is configured to present a list of likely tags to the user 101 to associate with the selected region 520. In one embodiment, a tag list 540 pops-up upon clicking on the selected region 520. The tag list 540 may include a text entry window 542 and a list of previously used tags. As text is entered in the text entry window 542, the list of previously used tags may be culled to include only those that match the text in some manner. In some embodiments, the list of previously used tags includes a text list 544 and a friends list 546. Examples of text strings in the text list 544 include names, words, objects, email addresses, phone numbers, user accounts, user names, text message numbers, voice mail user number, pager numbers, instant message addresses, and/or the like. Examples of entries in the friends list 546 include contacts within the social network environment 100, approved contacts, selected email addresses, selected phone numbers, selected instant message addresses, selected text message addresses, and/or the like. Clicking any of the previously used tags may associate the tag with the selected region 520. Clicking any of the entries in the friends list 546 may associate the friend's email address with the selected region 520.

Figure 6:
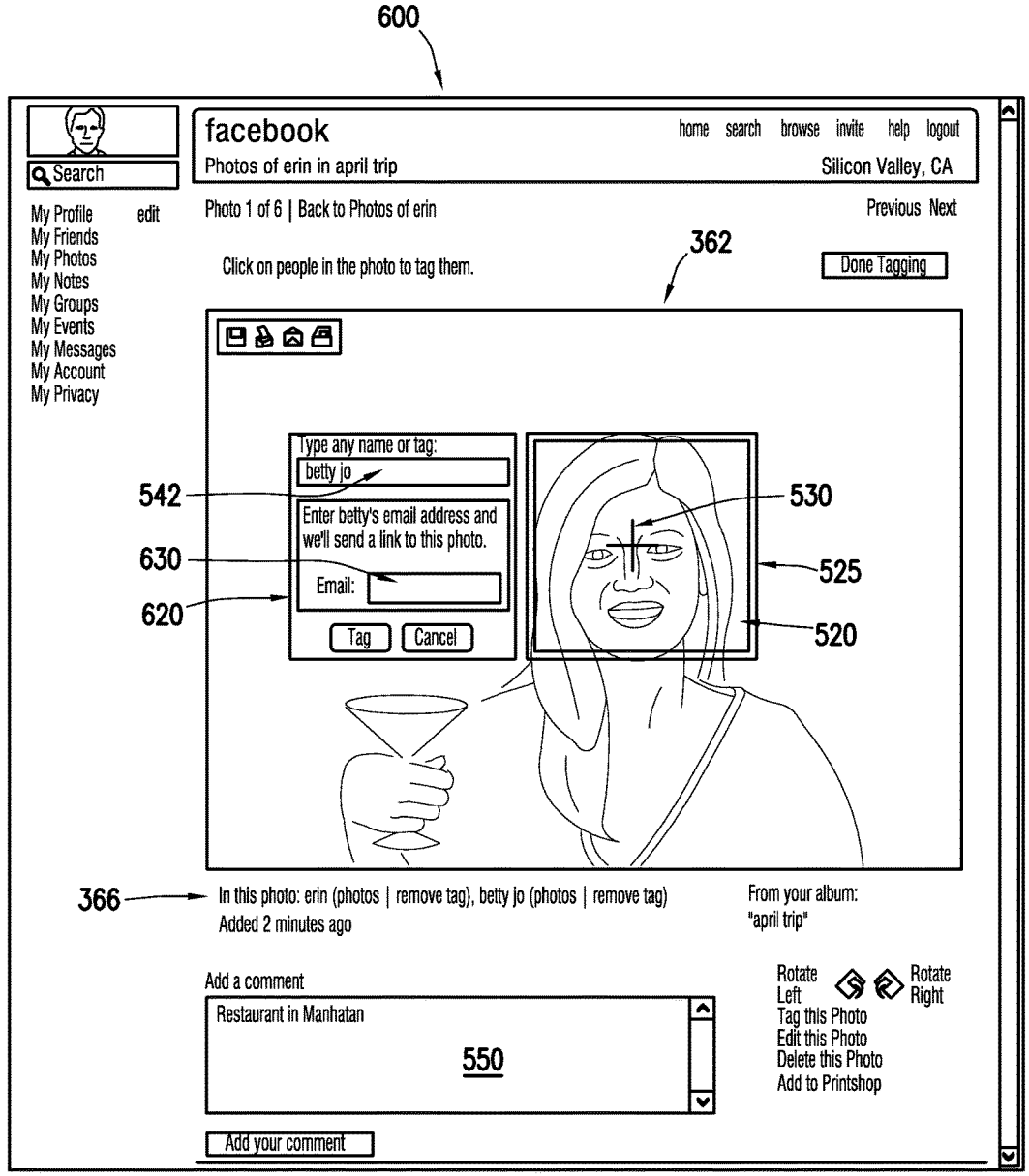
FIG. 6 is an exemplary screen shot of a tag web page.

Turning now to FIG. 6, an exemplary screen shot of a tag web page 600 further illustrating various functions of the components of the exemplary tag component 340 is shown. The tagged user 101b and/or the tagged non-user 102 may be notified that they have been tagged. The screen shot of the tag web page 600 differs from the tag web page 500 in that an email box 620 is displayed by the email component 430 on the digital image 362, instead of the tag list 540. The email component 430 may be configured to receive contact information (e.g., an email address) for a tagged non-user 102 and/or a tagged user 101b. In further embodiments, content information may also include a name of a person or entity, or information for a third person or entity. In some embodiments, the email component 430 is configured to send a notification to the tagged user 101b and/or to a tagged non-user 102, that they have been tagged in a digital image 362. Optionally, the email component 430 may be configured to send a notification to a third person or entity that a digital image 362 has been tagged.

In some embodiments, the email component 430 determines that text in the text entry window 542 may correspond to an unknown person, and presents the email box 620. The email box 620 includes an email entry field 630. If the user 101 enters an email address, the email component 430 is configured to send the notification to the email address entered in the email entry field 630.

If the email address entered in the email entry field 630 corresponds to a user in the social network (e.g., a tagged user 101b), the email notification may include a link to the tagged user 101b to view the tagged digital image 362 and/or confirm the tag. If the email address is not recognized by the email component 430 as an email address for a user 101 (e.g., a member of the social network environment 100) then the email component 430 may presume that the email address corresponds to a non-member (e.g., a tagged non-user 102). The email notification that may be sent to the tagged non-user 102 may include a link to view the tagged digital image 362 and/or confirm the tag. The email notification may further provide an invitation to become a member of the social network environment 100. In some embodiments, the tagged non-user 102 may be permitted to view the tagged digital image 362 but not confirm the tag until becoming a member of the social network environment 100. The email notification may further include advertising, e.g., advertising generated by the advertising module 214.

Figure 7:
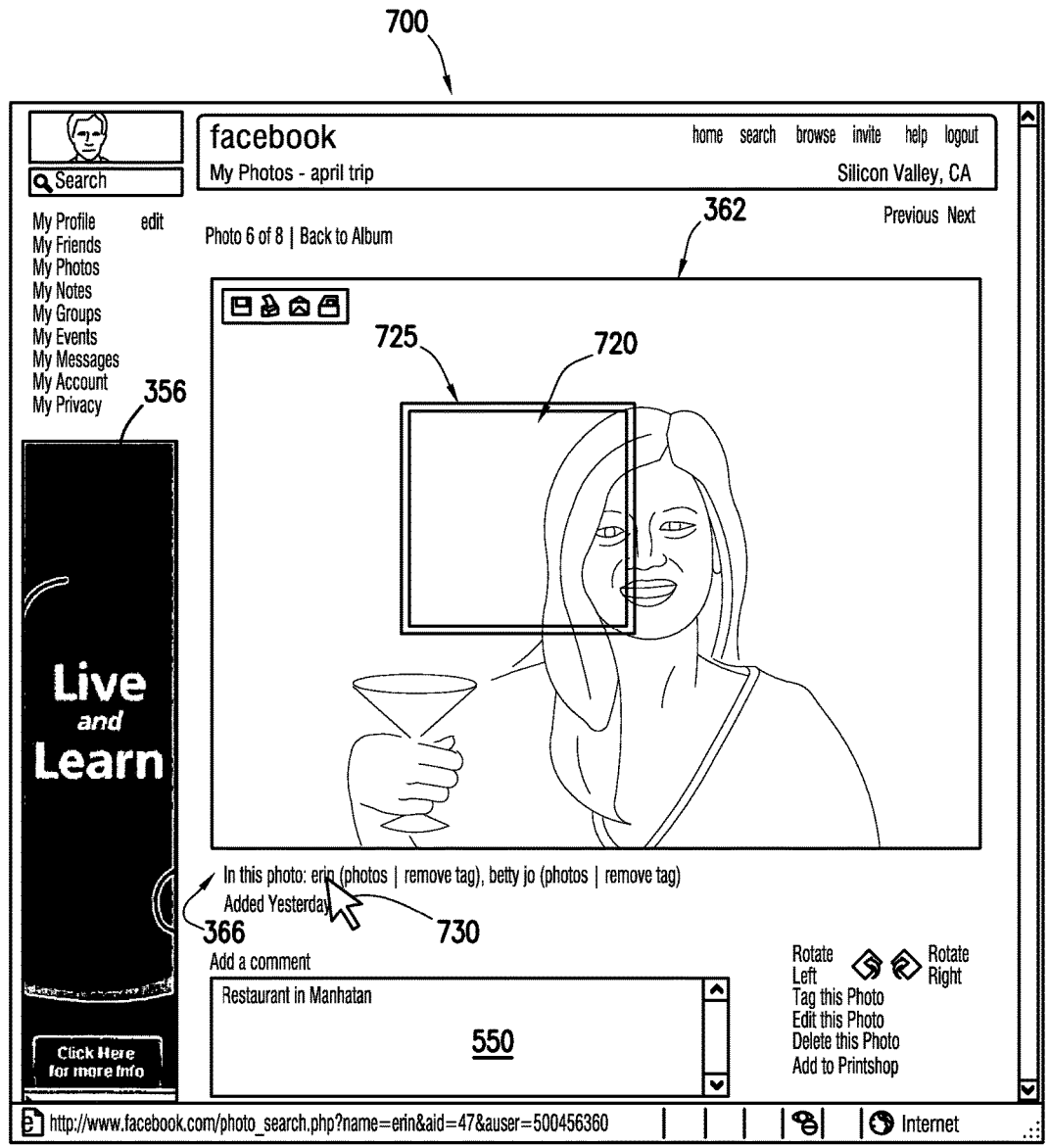
FIG. 7 is an exemplary screen shot of a tag web page.

Turning now to FIG. 7, an exemplary screen shot of a tag web page 700 is shown. FIG. 7 includes a selected region 720, a border 725, and a cursor 730. The screen shot of the tag web page 700 differs from the tag web page 500 in that the border 725 associated with a tag "erin" is displayed in a different location on the digital image 362 instead of the border 525. The selected region 720 differs from the selected region 520 in FIG. 5-6, in that a different region of the image 362 is selected. The cursor 730 differs from the cursor 530 in that the cursor 730 is pointing to the tag "erin" in the tag list 366 instead of a point in the image 362.

FIG. 7 illustrates the tag list 366 including two tags, namely, "erin" and "betty jo." The tag display component 440 is configured to permit the user 101 to display entries in the tag list 366 that have been associated with selected regions 720 in the digital image 362. Multiple selected regions 720 may be associated with tags. In one embodiment, the tag display component 440 highlights selected regions 720 associated with entries in the tag list 366 when the cursor hovers near and/or over entries in the tag list 366. FIG. 7 illustrates the cursor 730 hovering over the tag "erin" in the tag list 366. The tag display component 440 highlights the selected region 720 using the border 725. In some embodiments, the advertising module 214 provides advertising 356 to the tag display component 440 for display while the user 101 is viewing the digital image 362 and/or tags, or adding tags and/or adding comments.

Figure 8:
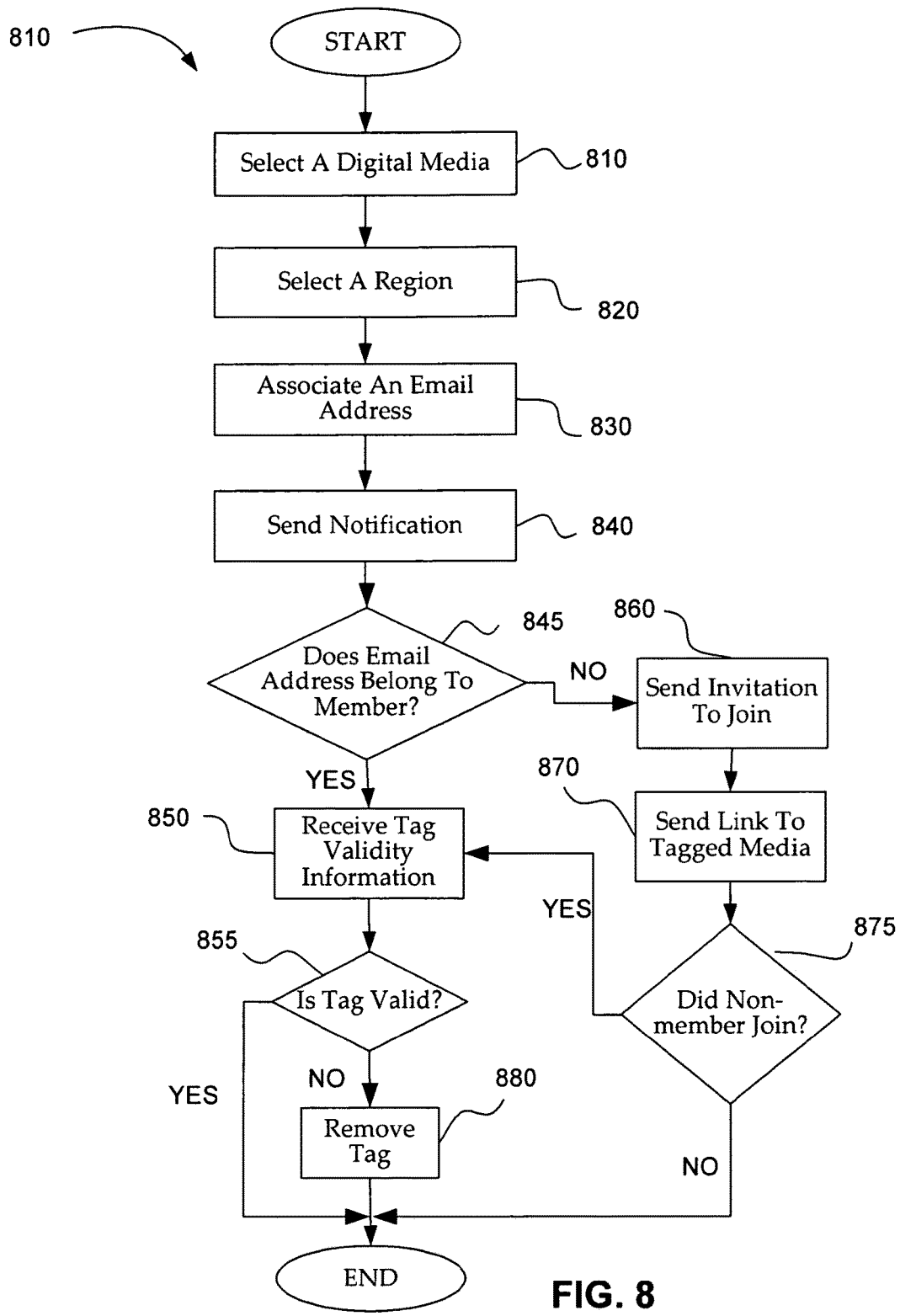
FIG. 8 is a flow diagram of an exemplary process for tagging digital images in a social network.

FIG. 8 is a flow diagram of an exemplary process 800 for tagging digital media, (e.g., the digital images) such as in a social network (e.g., the social network environment 100). At step 810, an item of digital media (e.g., a digital image 362) in the social network environment 100 is selected for tagging. In various embodiments, the digital image 362 is selected by a member of the social network environment 100, e.g., a user 101, the media owner 101a, the tagged user 101b, and the like, via a user device 110. In some embodiments, the digital image 362 is selected by a non-member of the social network environment 100. The social network provider 130 may receive the selection from the user 101 via the communications network 120.

At step 820 a region (e.g., the selected region 520) in the digital image 362 is selected for association with a tag. In some embodiments, the user 101 selects the selected region 520 using a mouse, trackball, touch pad, or the like to move a cursor (e.g., the cursor 530) to a point within the image 362, and clicking on the point. Optionally, the user 101 clicks on a point with the cursor 530 and drags the cursor 530 to another point (e.g., click and drag) to define the selected region 520. In some embodiments, the region selection component 410 displays a border (e.g., the border 525) to indicate the selected region 520.

At step 830 contact information (e.g., an email address) is associated with the selected region 520 using a tag. Contact information may also include a name of a person or entity, or information for a third person or entity. A tag in the form of text may be associated with the selected region 520. In various embodiments, the text may include a hyperlink, an email address and/or user address of a friend in the social network environment 100, an email address and or user address of a user 101 of the social network environment 100, an email address of a non-member of the social network environment 100, a phone number, an instant text message address, a pager number, a text message number, a mailing address, and/or the like. The tag may be input by the user 101. In some embodiments, the tag is suggested by the auto list component 420 of the tag component 340. Optionally, the social network provider 130 selects the tag.

At step 840 a notification of the tag is sent. In one embodiment, the notification of the tag is sent to the email address associated with the selected region 520, for example, using the email component 430. In further embodiments, the notification of the tag is sent to a third person or entity. In some embodiments, the notification includes a link enabling the tagged user 101b, or the tagged non-user 102, to view the tagged digital image 362. Optionally, the notification sent at step 840 includes an invitation to become a member of the social network environment 100 and/or advertising, e.g., advertising generated by the advertising module 214.

At step 845 it is determined if the email address belongs to a user 101 who is member of the social network environment 100 (e.g., the tagged user 101b). If the email address belongs to the tagged user 101b then the method proceeds to step 850 in which tag validity information is received from the tagged user 101b. In some embodiments, step 850 includes displaying the digital image 362 and tag to the tagged user 101b and providing the tagged user 101b an option to confirm the tag or disaffirm the tag (e.g., using radio buttons).

At step 855 it is determined if the tag is valid. For example, if the tagged user 101b confirms the tag in step 850 then the tag is valid. However, if the tagged user 101b disaffirms the tag in step 850 then the tag is not valid. If the tag is valid, the method 800 ends. If the tag is not valid then the method proceeds to step 880 and removes the tag and ends. In some embodiments, the media owner 101a can override the validity information. Optionally, the tag is hidden from users 101 other than the media owner 101a instead of removed.

If the email address does not belong to a user 101 who is a member of the social network environment 100 (e.g., belongs to the tagged non-user 102) the method proceeds to step 860. In step 860 an invitation is sent to the tagged non-user 102 to become a member of the social network environment 100. The invitation to become a member of the social network environment 100 may include a link to a membership registration web page. Optionally, the advertising module 214 attaches advertising to the invitation to become a member of the social network environment 100 at step 860. In optional step 870, a link is sent to the digital image 362 that will enable the tagged non-user 102 to view the digital image 362 and the tag associated with a region 520. In an alternative embodiment, at step 870 the digital image 362 associated with the tagged text, is sent to the tagged non-user 102 for viewing the digital image 362 and the tagged text associated with the region 520.

In one embodiment, the tagged non-user 102 follows the link to the membership registration web page and optional step 875 determines if the tagged non-user 102 has become a member of the social network environment 100. The process proceeds to step 850 upon completion of the registration. If the tagged non-user 102 elects not to become a member of the social network environment 100, the method 800 ends. In some embodiments, if the tagged non-user 102 elects to become a member, the tagged non-user 102 becomes a tagged user 101b and thus may review the digital images 362 that have been tagged with the new tagged user's 101b email address at any time.

Several embodiments are specifically illustrated and/or described herein. However, it will be appreciated that modifications and variations are covered by the above teachings and within the scope of the appended claims without departing from the spirit and intended scope thereof. For example, media may be tagged with hyperlink to advertising. For example, video clips may be tagged. For example audio may be used instead of text to tag the digital media. For example, digital images may be used instead of text to tag the digital media. For example, hyperlinks to video may be used instead of text to tag the digital media. For example, objects in online games may be tagged. Various embodiments of the invention include logic stored on computer readable media, the logic configured to perform methods of the invention.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method comprising:
   by a computer system, presenting to a first user of a social-networking system a graphical user interface comprising an item of digital media, wherein the graphical user interface comprises a media-interface-control element comprising a component operable to receive one or more text characters and, based at least in part on the text characters, to display a list of suggested tags that identify one or more other users of the social-networking system;
   by the computer system, presenting, to a second user of the social networking system, a second graphical user interface that includes options for privacy settings of the second user;
   by the computer system, receiving the privacy settings of the second user limiting a grouping of users of a plurality of groupings of users access to contact information of the second user, wherein the grouping of users includes the first user, wherein each of the plurality of groupings of users includes multiple users of the social-networking system;
   by the computer system, receiving input from the first user indicating a tag for the item of digital media from the list of suggested tags;
   by the computer system, associating the tag with the item of digital media, the association of the tag with the item of digital media associating, within the social-networking system, the contact information of the second user with the item of digital media, information in the tag comprising a hyperlink associated with the second user within the social-networking system, and the privacy settings of the second user limiting access of the grouping of users to the contact information of the second user; and
   by the computer system, providing, based on the contact information of the second user that is not accessible by the grouping of users through the social-networking system in accordance with the privacy settings of the second user, a notification to be sent to the second user of the tag being associated with the item of digital media by the first user, wherein the notification comprises a hyperlink to the item of digital media.

2. The method of claim 1, wherein:
   the contact information comprises an e-mail address associated with the second user; and
   the notification comprises an e-mail to the e-mail address.

3. The method of claim 1, wherein:
   the contact information comprises a text-message number associated with the second user; and
   the notification comprises a text message to a text message number.

4. The method of claim 1, wherein tagged text is associated with the tag for display with the item of digital media, a user hovering a cursor over the tagged text causing a bounded two-dimensional region of the digital media associated with the tag to he visually highlighted.

5. The method of claim 1, wherein the social-networking system comprises a graph comprising a plurality of nodes and edges connecting the nodes, the nodes comprising user nodes that each correspond to a user of the social-networking system, a user node in the graph corresponding to the first user.

6. The method of claim 1, further comprising:
   by the computer system, receiving from the second user an indication that the second user rejects the tag;
   by the computer system, receiving from the first user an override of the indication that the second user rejects the tag; and
   by the computer system and in response to receiving from the first user the override, providing the item of digital media with the tag for display to one or more users.

7. The method of claim 1, wherein the grouping of users is grouped according to a geographical location of residence of the second user.

8. The method of claim 1, wherein the grouping of users is grouped according to a university attended.

9. The method of claim 1, wherein the grouping of users is grouped according to a city.

10. One or more computer-readable non-transitory storage media embodying software operable when executed by one or more computer systems to:
   present to a first user of a social-networking system a graphical user interface comprising an item of digital media, wherein the graphical user interface comprises a media-interface-control element comprising a component operable to receive one or more text characters and, based at least in part on the text characters, to display a list of suggested tags that identify one or more other users of the social-networking system;
   present, to a second user of the social networking system, a second graphical user interface that includes options for privacy settings of the second user;
   receive, the privacy settings of the second user limiting a grouping of users of a plurality of groupings of users access to the contact information of the second user, wherein the grouping of users includes the first user, wherein each of the plurality of groupings of users includes multiple users of the social-networking system;
   receive input from the first user indicating a tag for the item of digital media from the list of suggested tags;
   associate the tag with the item of digital media, the association of the tag with the item of digital media associating, within the social-networking system, the contact information of the second user with the item of digital media, information in the tag comprising a hyperlink associated with the second user within the social-networking system, and the privacy settings of the second user limiting access of the grouping of users to the contact information of the second user;
   provide, based on the contact information of the second user that is not accessible to the grouping of users through the social-networking system in accordance with the privacy settings of the second user, a notification to be sent to the second user of the tag being associated with the item of digital media by the grouping of users, wherein the notification comprises a hyperlink to the item of digital media.

11. The media of claim 10, wherein:
  the contact information comprises an e-mail address associated with the second user; and
  the notification comprises an e-mail to the e-mail address.

12. The media of claim 10, wherein tagged text is associated with the tag for display with the item of digital media, a user hovering a cursor over the tagged text causing a bounded two-dimensional region of the digital media associated with the tag to be visually highlighted.

13. The media of claim 10, wherein the social-networking system comprises a graph comprising a plurality of nodes and edges connecting the nodes, the nodes comprising user nodes that each correspond to a user of the social-networking system, a user node in the graph corresponding to the first user.

14. The media of claim 10, wherein the software operable when executed by one or more computer systems to:
  receive from the second user an indication that the second user rejects the tag;
  receive from the first user an override of the indication that the second user rejects the tag; and
  in response to receiving from the first user the override, provide the item of digital media with the tag for display to one or more users.

15. The media of claim 13, wherein the grouping of users is grouped according to a geographical location of residence of the second user.

16. The media of claim 10, wherein the grouping of users is grouped according to a university attended.

17. The media of claim 10, wherein the grouping of users is grouped according to a city.

* * * * *